US012417877B2

(12) United States Patent
Masuda et al.

(10) Patent No.: US 12,417,877 B2
(45) Date of Patent: Sep. 16, 2025

(54) COIL COMPONENT

(71) Applicant: Murata Manufacturing Co., Ltd., Kyoto-fu (JP)

(72) Inventors: Yukinobu Masuda, Nagaokakyo (JP); Shingo Nakamoto, Nagaokakyo (JP); Kaori Takezawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 683 days.

(21) Appl. No.: 17/815,148

(22) Filed: Jul. 26, 2022

(65) Prior Publication Data

US 2023/0036007 A1 Feb. 2, 2023

(30) Foreign Application Priority Data

Jul. 28, 2021 (JP) ................................ 2021-122963

(51) Int. Cl.
*H01F 27/29* (2006.01)
*H01F 17/04* (2006.01)
*H01F 27/28* (2006.01)

(52) U.S. Cl.
CPC ......... *H01F 27/292* (2013.01); *H01F 17/045* (2013.01); *H01F 27/2823* (2013.01)

(58) Field of Classification Search
CPC ... H01F 27/292; H01F 17/045; H01F 27/2823
See application file for complete search history.

(56) References Cited

U.S. PATENT DOCUMENTS

2004/0263285 A1* 12/2004 Suzuki .................. H01F 41/082 333/185
2017/0025212 A1* 1/2017 Jerez ........................ H01F 27/29
2017/0140858 A1* 5/2017 Takagi ................ H01F 27/2828
2019/0019612 A1* 1/2019 Kawasaki ............... H01F 17/04
2019/0189337 A1* 6/2019 Kawasaki ............... H01F 27/24

FOREIGN PATENT DOCUMENTS

JP H11204346 A * 7/1999
JP 2003151837 A * 5/2003
JP 2005322688 A * 11/2005
JP 2009-272315 A 11/2009
JP 2019-135763 A 8/2019
JP 2019-186414 A 10/2019

* cited by examiner

*Primary Examiner* — Malcolm Barnes
(74) *Attorney, Agent, or Firm* — Studebaker Brackett PLLC

(57) ABSTRACT

A coil component has a structure capable of suppressing disconnection of a center wire material of a wire and reducing inconvenience due to deterioration of an insulating film. A slope is provided at a boundary portion between a mounting surface and an inner end face of a flange portion. A terminal electrode includes a first electrode portion provided along the mounting surface, and a second electrode portion provided along the slope so as to extend from a first electrode portion to the middle of the slope. A wire is electrically and mechanically connected in both the first electrode portion and the second electrode portion. A diameter of the wire on a winding core portion is larger than a dimension of the second electrode portion in a height direction, but a dimension of the slope in a depth direction is larger than the diameter of the wire.

20 Claims, 8 Drawing Sheets

COIL COMPONENT

CROSS-REFERENCE TO RELATED APPLICATION

This application claims benefit of priority to Japanese Patent Application No. 2021-122963, filed Jul. 28, 2021, the entire content of which is incorporated herein by reference.

BACKGROUND

Technical Field

The present disclosure relates to a winding-type coil component having a structure in which a wire is wound around a core, and particularly relates to a structure of a connection portion between a wire and a terminal electrode.

Background Art

For example, Japanese Patent Application Laid-Open No. 2009-272315 discloses a winding-type coil component in which end portions of a wire are connected to terminal electrodes respectively provided on flange portions positioned at both ends of a drum-shaped core by thermal pressure bonding.

FIGS. 9A and 9B illustrate a part of a flange portion 2 positioned at one end of a drum-shaped core 1 in an enlarged manner FIG. 9A is a plan view illustrating the flange portion 2 from a mounting surface 3 side facing a mounting substrate side at the time of mounting, and FIG. 9B is a sectional view taken along line 9B-9B in FIG. 9A.

In the flange portion 2 illustrated in FIGS. 9A and 9B, a terminal electrode 4 is provided on the mounting surface 3 facing the mounting substrate side at the time of mounting. The terminal electrode 4 includes, for example, an underlayer Ag layer 5 formed by baking a conductive paste containing Ag as a conductive component, and a Cu layer 6, a Ni layer 7, and a Sn layer 8 sequentially formed on the underlayer Ag layer by plating. The Sn layer 8 that provides a surface of the terminal electrode 4 realizes good solderability at the time of mounting. In FIG. 9B, in order to clearly illustrate each of the Ag layer 5, the Cu layer 6, the Ni layer 7, and the Sn layer 8, a thickness of the terminal electrode 4 is exaggerated.

On the other hand, although not illustrated, a wire 10 is spirally wound around a winding core portion 9 of the core 1. An illustrated end portion of the wire 10 is electrically and mechanically connected to the above-mentioned terminal electrode 4. The wire 10 includes, for example, a linear center wire material 10*a* made of a copper wire, and an insulating film 10*b* covering the center wire material 10*a* and made of an electrically insulating resin such as polyurethane or polyimide.

SUMMARY

In order to connect the wire 10 to the terminal electrode 4, thermal pressure bonding for pressurizing an end portion of the wire 10 toward the terminal electrode 4 is applied by a heater chip. In order to sufficiently and appropriately achieve thermal pressure bonding of the wire 10 to the terminal electrode 4, it is necessary to apply a sufficiently high pressure to the wire 10 at a sufficiently high temperature to appropriately plastically deform the wire 10.

However, as a result of the pressurization in the above-described thermal pressure bonding step, stress concentrates on a portion of the wire 10 near a ridgeline where the mounting surface 3 of the flange portion 2 and an inner end face 11 intersect with each other, and the wire is easily disconnected in this portion.

The insulating film 10*b* of the wire 10 is decomposed and removed by heat in thermal pressure bonding. In FIGS. 9A and 9B, a portion (hereinafter, "removed portion") from which the insulating film 10*b* is removed by thermal pressure bonding is indicated by "R1". Near the removed portion R1 in the insulating film 10*b*, there is a portion that deteriorates though the insulating film 10*b* is not removed by heat due to thermal pressure bonding. In FIG. 9, a portion (hereinafter, "deteriorated portion") where the insulating film 10*b* is deteriorated by heat due to thermal pressure bonding is indicated by "R2". The deteriorated portion R2 lacks reliability with respect to electrical insulation.

As illustrated in FIG. 9, the deteriorated portion R2 protrudes to a position away from the inner end face 11 of the flange portion 2. The deteriorated portion R2 protrudes in this manner, and thus, a probability that the deteriorated portion carelessly comes into contact with an electrical element other than the wire 10, for example, another wire is increased. In Japanese Patent Application Laid-Open No. 2009-272315, although only a coil component constituting a single coil is described, in the case of a winding-type coil component including a plurality of wires such as a common mode choke coil, for example, a possibility that the protrusion of the deteriorated portion R2 causes an electrical short circuit between adjacent wires cannot be denied.

The deterioration of the insulating film 10*b* of the wire 10 leading to the generation of the deteriorated portion R2 accelerates the oxidation of the center wire material 10*a* of the wire 10. At this time, when the center wire material 10*a* of the wire 10 is thin or narrow, the proportion of the oxidized portion increases, and the wire 10 may be disconnected.

Therefore, the present disclosure provides a coil component having a structure capable of suppressing disconnection of a center wire material of a wire and reducing inconvenience due to deterioration of an insulating film.

The present disclosure includes a coil component including a core that has a winding core portion and flange portions provided at both end portions of the winding core portion in an axial direction, a wire that is wound around the winding core portion, and terminal electrodes that are provided at the flange portions, and are electrically and mechanically connected to end portions of the wire.

Each of the flange portions has an inner end face facing the winding core portion side and positioning each of the end portions of the winding core portion in the axial direction, an outer end face facing an opposite side of the inner end face, a mounting surface connecting the inner end face and the outer end face and facing a mounting substrate side at the time of mounting, and a top surface facing an opposite side of the mounting surface.

In order to solve the above-described technical problem in the coil component having such a configuration, the present disclosure has the following configuration.

A slope extending so as to connect a first intermediate position in a direction along the mounting surface between the inner end face and the outer end face and a second intermediate position in a direction along the inner end face between the mounting surface and the top surface is provided at a boundary portion between the mounting surface of the flange portion and the inner end face.

Each of the terminal electrodes includes a first electrode portion provided along the mounting surface and a second electrode portion provided along the slope so as to extend from the first electrode portion to a middle of the slope.

The wire is electrically and mechanically connected at both the first electrode portion and the second electrode portion.

A diameter of the wire on the winding core portion is larger than a dimension of the second electrode portion in a height direction measured in a direction orthogonal to the mounting surface, and a dimension of the slope in a depth direction which is a distance from the first intermediate position to the second intermediate position measured in the direction orthogonal to the mounting surface is larger than the diameter of the wire.

According to the coil component of the present disclosure, the slope is provided at the flange portion of the core, the terminal electrode includes the first electrode portion provided along the mounting surface of the flange portion and the second electrode portion provided along the slope from the first electrode portion, and the wire is electrically and mechanically connected in both the first electrode portion and the second electrode portion. Accordingly, connection reliability between the terminal electrode and the wire can be enhanced, stress concentration on the wire at the portion near the ridgeline where the mounting surface of the flange portion and the inner end face intersect can be alleviated at the time of thermal pressure bonding, and disconnection at this portion can be unlikely to occur.

The diameter of the wire on the winding core portion, that is, the original diameter of the wire before thermal pressure bonding is larger than the dimension of the second electrode portion in the height direction, but since the dimension of the slope in the depth direction is larger than the diameter of the wire, a part of the wire positioned on the slope can be prevented from being pressure-bonded at the time of thermal pressure bonding. Accordingly, the region of the wire from which the insulating film is removed can be reduced, and the thickness of the wire near the portion from which the insulating film is removed can be secured. As a result, the disconnection near the portion where the insulating film is removed can be less likely to occur.

Since the wire connected to the terminal electrode is electrically and mechanically connected not only to the first electrode portion provided along the mounting surface of the flange portion but also to the second electrode portion provided along the slope, the wire can be in a state along the slope. Thus, it is possible to reduce a degree of protrusion of the deteriorated portion of the insulating film which may be brought into the wire by thermal pressure bonding to the position away from the inner end face of the flange portion. As a result, when the deteriorated portion is generated in the insulating film at the time of thermal pressure bonding, reliability for preventing the electrical short circuit can be secured.

Since the second electrode portion of the terminal electrode extends only to the middle of the slope, that is, since there is the portion where the electrode is not formed on the second intermediate position side of the slope, the wire connected to the terminal electrode is separated from the slope, and the insulating film does not hit the core at the time of thermal pressure bonding and is not deformed, and the original shape can be maintained. Accordingly, resistance to corrosion of the wire due to flux or moisture is improved.

BRIEF DESCRIPTION OF THE DRAWINGS

FIGS. 1A and 1B illustrate a part of a first flange portion positioned at one end of a core included in a coil component according to a first embodiment of the present disclosure in an enlarged manner, in which FIG. 1A is a plan view illustrating the first flange portion from a mounting surface side facing a mounting substrate side at the time of mounting, and FIG. 1B is a sectional view taken along line 1B-1B of FIG. 1A;

FIGS. 9A and 9B illustrate a part of a flange portion positioned at one end of a core included in a coil component described in Japanese Patent Application Laid-Open No. 2009-272315 in an enlarged manner, in which FIG. 9A is a plan view illustrating the flange portion from a mounting surface side facing a mounting substrate side at the time of mounting, and FIG. 9B is a sectional view taken along line 9B-9B in FIG. 9A.

DETAILED DESCRIPTION

A coil component 21 according to a first embodiment of the present disclosure will be described with reference to FIGS. 1A to 3.

Figure 2:
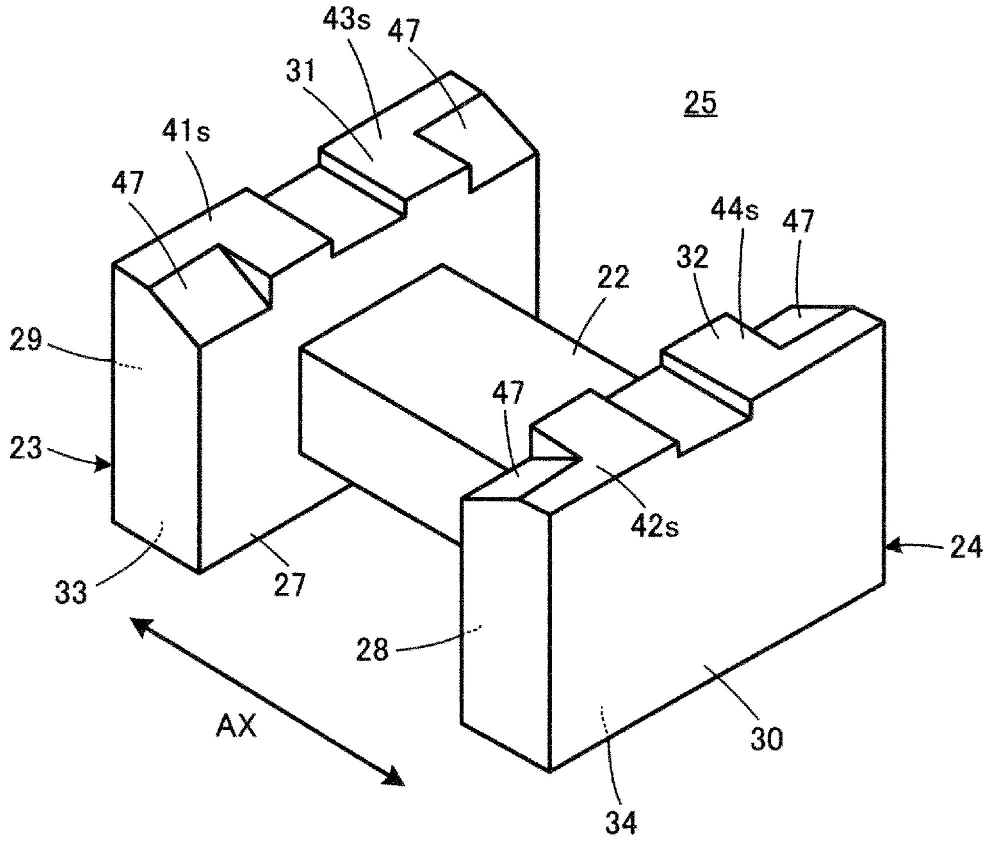
FIG. 2 is a perspective view illustrating an appearance of an entire core included in the coil component illustrated in FIGS. 1A and 1B with mounting surfaces facing upward.

Referring mainly to FIG. 2, the coil component 21 includes a drum-shaped core 25 having a winding core portion 22 and a first flange portion 23 and a second flange portion 24 provided at a first end portion and a second end portion opposite to each other in an axial direction AX of the winding core portion 22. The core 25 is made of, for example, ferrite, alumina, or resin containing metal magnetic powder. The winding core portion 22 has, for example, a quadrangular sectional shape in the drawing, but may have a polygonal shape such as a hexagonal shape, a circular shape, an elliptical shape, or a shape obtained by combining these shapes.

The first flange portion 23 and the second flange portion 24 include inner end faces 27 and 28 facing the winding core portion 22 side and positioning the first end portion and the second end portion of the winding core portion 22, outer end faces 29 and 30 facing outward on opposite sides to the inner end faces 27 and 28, mounting surfaces 31 and 32 connecting the inner end faces 27 and 28 and the outer end faces 29 and 30, facing the mounting substrate side at the time of mounting, and top surfaces 33 and 34 on opposite sides to the mounting surfaces 31 and 32, respectively.

Figure 1A:
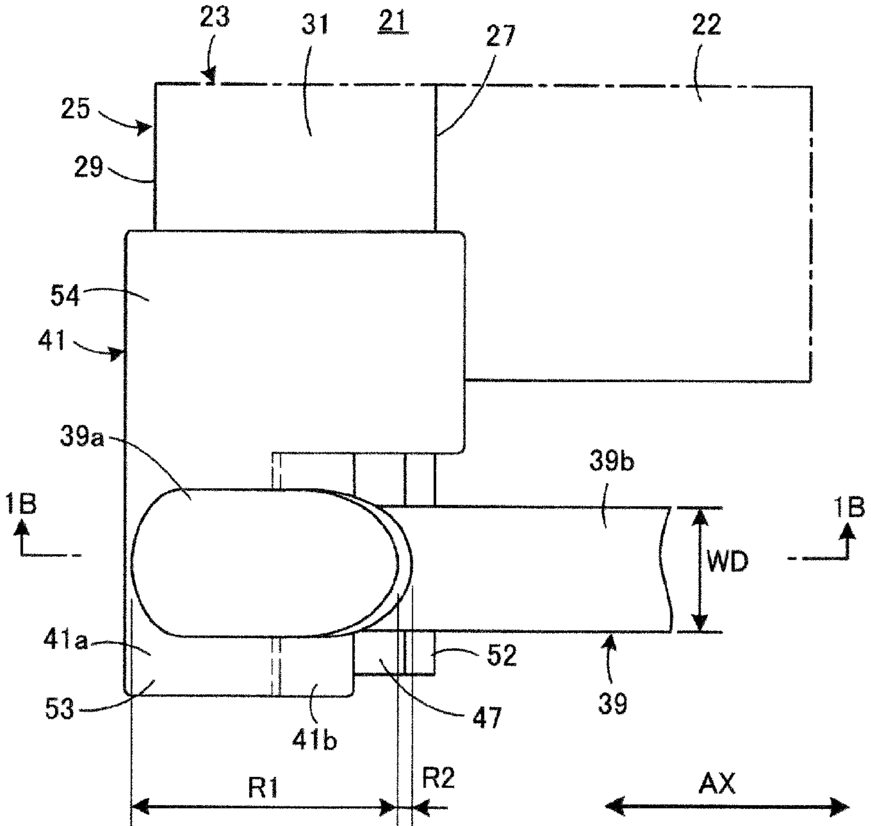
Figure 1B:
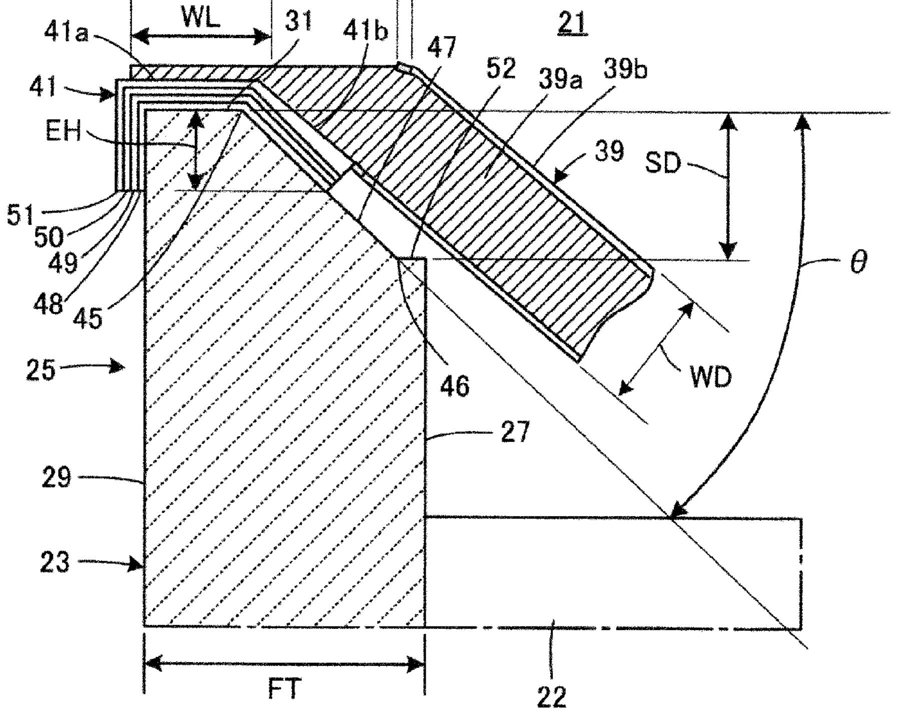
Figure 3:
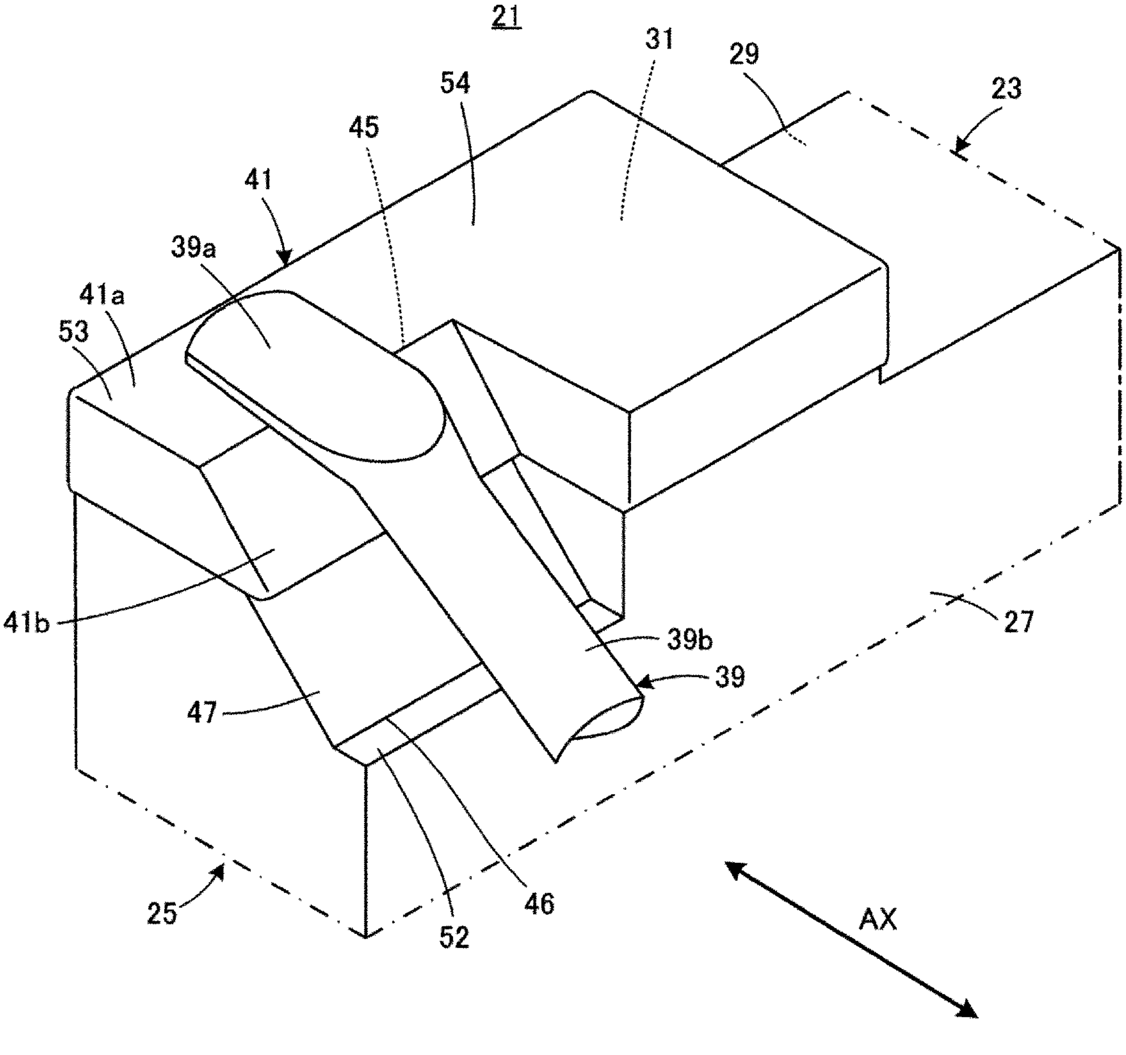
FIG. 3 is an enlarged perspective view illustrating a slope included in the first flange portion included in the core illustrated in FIG. 2 and a periphery thereof.

The coil component 21 constitutes, for example, a common mode choke coil, and includes a first wire and a second wire wound around the winding core portion 22 of the core 25. In FIGS. 1A, 1B and 3, only a first wire 39 is illustrated, and only one end portion of the first wire 39 is illustrated. Although not illustrated, in the common mode choke coil, as is well known, the first wire and the second wire are wound in the same direction around the winding core portion 22.

One end portion and the other end portion of the first wire are electrically and mechanically connected to a first terminal electrode and a second terminal electrode, respectively. One end portion and the other end portion of the second wire are electrically and mechanically connected to a third terminal electrode and a fourth terminal electrode, respectively. Among these first to fourth terminal electrodes, only a first terminal electrode 41 is illustrated in FIGS. 1A, 1B and 3. FIGS. 1A, 1B and 3 illustrate a state in which one end portion of the first wire 39 is electrically and mechanically connected to the first terminal electrode 41.

In FIG. 2, a position of the first terminal electrode 41 is indicated by "41*s*" and a lead wire instead of illustrating the first terminal electrode. Similarly, positions of the second to fourth terminal electrodes 42 to 44 are illustrated by "42*s*", "43*s*", and "44*s*" and lead wires instead of illustrating the second to fourth terminal electrodes. When a direction orthogonal to the axial direction AX of the winding core portion 22 and a direction in which the mounting surfaces 31 and 32 extend is a width direction, as can be seen from the positions indicated by "41*s*", "42*s*", "43*s*", and "44*s*", respectively, the first terminal electrode 41 and the third terminal electrode 43 are provided side by side in the width direction on the first flange portion 23, and the second terminal electrode 42 and the fourth terminal electrode 44 are provided side by side in the width direction on the second flange portion 24.

As can be seen from FIG. 2, the first flange portion 23 and the second flange portion 24 have symmetrical shapes with respect to each other, and the first flange portion 23 itself and the second flange portion 24 itself also have symmetrical shapes with respect to a central axis. Accordingly, hereinafter, a portion of the first flange portion 23 where the first terminal electrode 41 is provided will be described in detail with reference to FIGS. 1A, 1B and 3, and the detailed description of a portion of the first flange portion 23 where the third terminal electrode 43 is provided and portions of the second flange portion 24 where the second terminal electrode 42 and the fourth terminal electrode 44 are provided will be omitted. In the following description, the "first flange portion" may be simply referred to as a "flange portion", the "first wire" may be simply referred to as a "wire", and the "first terminal electrode" may be simply referred to as a "terminal electrode".

A slope 47 which extends so as to connect a first intermediate position 45 in a direction along the mounting surface 31 between the inner end face 27 and the outer end face 29 and a second intermediate position 46 in a direction along the inner end face 27 between the mounting surface 31 and the top surface 33 (see FIG. 2) is provided at a boundary portion of the flange portion 23 between the mounting surface 31 and the inner end face 27.

On the other hand, the terminal electrode 41 includes a first electrode portion 41*a* provided along the mounting surface 31, and a second electrode portion 41*b* provided along the slope 47 so as to extend from the first electrode portion 41*a* to the middle of the slope 47. The terminal electrode 41 includes, for example, an underlayer Ag layer 48 formed by immersing or printing a conductive paste containing Ag as a conductive component and then baking the paste, and a Cu layer 49, a Ni layer 50, and a Sn layer 51 sequentially formed on the underlayer Ag layer by plating. In FIG. 1B, in order to clearly illustrate each of the Ag layer 48, the Cu layer 49, the Ni layer 50, and the Sn layer 51, a thickness of the terminal electrode 41 is illustrated in an exaggerated manner.

The wire 39 includes, for example, a center wire material 39*a* made of a favorable conductive metal such as copper, silver, or gold, and an insulating film 39*b* covering the center wire material 39*a* and made of an electrically insulating resin such as polyamideimide, polyurethane, or polyesterimide.

In order to connect the wire 39 to the terminal electrode 41, thermal pressure bonding for pressurizing the end portion of the wire 39 toward the terminal electrode 41 is applied by a heater chip. As a result, the wire 39 is electrically and mechanically connected in both the first electrode portion 41*a* and the second electrode portion 41*b*. Accordingly, connection reliability between the terminal electrode 41 and the wire 39 can be enhanced. Since the second electrode portion 41*b* is provided along the slope 47, it is possible to alleviate stress concentration on the wire 39 at a portion near a ridgeline where the mounting surface 31 of the flange portion 23 and the inner end face 27 intersect each other at the time of thermal pressure bonding, and the disconnection near the portion where the insulating film is removed can be less likely to occur at this portion.

By thermal pressure bonding, the insulating film 39*b* of the wire 39 is decomposed and removed by heat. In FIGS. 1A and 1B, the removed portion is indicated by "R1". The insulating film 39*b* deteriorates near the removed portion R1 though the insulating film is not removed by thermal pressure bonding. In FIGS. 1A and 1B, the deteriorated portion of the insulating film 39*b* due to thermal pressure bonding is indicated by "R2".

In the connection state of the wire 39 to the terminal electrode 41 illustrated in FIGS. 1A and 1B, a diameter of the wire 39 on the winding core portion 22, that is, an original diameter WD of the wire 39 before thermal pressure bonding is larger than a dimension EH of the second electrode portion 41*b* in a height direction measured in a direction orthogonal to the mounting surface 31, but a dimension SD of the slope 47 in a depth direction which is a distance from the first intermediate position 45 to the second intermediate position 46 measured in the direction orthogonal to the mounting surface 31 is larger than the diameter WD of the wire 39. The diameter WD of the wire 39 is 100 μm or more, for example, 150 μm. In the coil component according to the present disclosure, it is more advantageous that the wire has a large diameter of 100 μm or more.

The above condition is satisfied, and thus, it is possible to prevent a part of the wire 39 positioned on the slope 47 from being pressure-bonded at the time of thermal pressure bonding. Accordingly, the removed portion R1 of the insulating film 39*b* in the wire 39 can be reduced, and the diameter of the wire 39 near the removed portion R1 of the insulating film 39*b* can be secured. As a result, disconnection near the removed portion R1 of the insulating film 39*b* can be less likely to occur.

Since the wire 39 connected to the terminal electrode 41 is electrically and mechanically connected not only to the first electrode portion 41*a* but also to the second electrode portion 41*b* provided along the slope 47, the wire 39 can enter a state along the slope 47. Thus, a degree of protrusion of the deteriorated portion R2 of the insulating film 39*b* that can be brought into the wire 39 by thermal pressure bonding to a position away from the inner end face 27 of the flange portion 23 can be reduced. As a result, though the deteriorated portion R2 is generated in the insulating film 39*b* at the time of thermal pressure bonding, for example, the reliability that can prevent an electrical short circuit between the plurality of wires in the common mode choke coil can be enhanced. It is preferable that the deteriorated portion R2 is accommodated in entire in a position closer to the outer end face 29 than a surface including the inner end face 27 of the flange portion 23.

Since the second electrode portion 41*b* of the terminal electrode 41 extends only to the middle of the slope 47, that is, since there is a portion where the electrode is not formed on the second intermediate position 46 side of the slope 47, the wire 39 connected to the terminal electrode 41 is in a state of being separated from the slope 47, and the insulating film 39*b* does not hit and deform the core 25 at the time of thermal pressure bonding. Thus, the original shape can be maintained. Accordingly, resistance to corrosion of the wire 39 due to flux or moisture is improved.

This embodiment further has the following preferable features.

As viewed from the direction orthogonal to the mounting surface 31 of the flange portion 23, that is, as viewed in a direction illustrated in FIG. 1A, it is preferable that contour lines of the slope 47 extend in the direction orthogonal to the axial direction AX of the winding core portion 22. According to this configuration, when the wire 39 is pressure-bonded to the terminal electrode 41 in a state of being disposed along the slope 47, since an end of the wire 39 can be positioned on the outer end face 29 side of the flange portion 23, the excess of the wire 39 can be easily cut.

With the above-described configuration, it is preferable that an angle θ (see FIG. 1B) formed by the slope 47 with respect to a surface including the mounting surface 31 is equal to or greater than 20° and is equal to or less than 60° (i.e., from 20° to 60°). When the angle θ is less than 20°, a large tensile stress is generated in the wire 39 due to the pressurizing of the heater chip at the time of thermal pressure bonding, and there is a concern that the wire 39 is disconnected. On the other hand, when the angle θ exceeds 60°, it becomes difficult to mold the core 25.

It is preferable that a flat portion 52 extending in parallel with the mounting surface 31 is provided at the second intermediate position 46 where one end portion of the slope 47 is positioned. This configuration facilitates molding of the core 25 in a mold. In FIG. 2, the illustration of the flat portion 52 is omitted.

With respect to the dimension measured in the axial direction AX of the winding core portion 22, it is preferable that a dimension WL (see FIG. 1B) of the connection portion where the wire 39 is connected to the first electrode portion 41*a* of the terminal electrode 41 is equal to or greater than 20% and equal to or less than 50% (i.e., from 20% to 50%) of a dimension between the inner end face 27 and the outer end face 29 of the flange portion 23, that is, a dimension FT (see FIG. 1B) of the flange portion 23 in the thickness direction. When the dimension WL is less than 20%, the tensile strength of the wire 39 is lowered, a current density flowing through the terminal electrode 41 is high (a current value per unit is small), and there is a concern that electromigration occurs or disconnection occurs in a long-term reliability test. On the other hand, when the dimension WL exceeds 50%, there is a concern that the deteriorated portion R2 of the insulating film 39*b* largely protrudes from the inner end face 27 of the flange portion 23.

It is preferable that the first electrode portion 41*a* of the terminal electrode 41 includes a connection portion 53 to which the wire 39 is connected and a mounting portion 54 to be connected to the mounting substrate, and the connection portion 53 and the mounting portion 54 form the same surface. The connection portion 53 is also a pressure bonding portion in which the wire 39 is pressure-bonded to the first electrode portion 41*a*. The mounting portion 54 refers to a portion facing a land formed on the mounting substrate when the coil component 21 is mounted on the mounting substrate. According to the above configuration, when the wire 39 is pressure-bonded to the connection portion 53, the excess of the wire 39 is easily cut and removed. When the above configuration is not provided, more specifically, when a height of the connection portion 53 is lower than a height of the mounting portion 54, the wire 39 may not be sufficiently crushed at the time of thermal pressure bonding. In this case, the excess of the wire 39 is not cut, and the excess tends to remain. Thus, in a step of cutting the wire 39, not only tearing the wire 39 but also machining using a cutting blade may be required.

As described above, the terminal electrode 41 includes the underlayer Ag layer 48, and the Cu layer 49, the Ni layer 50, and the Sn layer 51 sequentially formed on the underlayer Ag layer by plating. That is, the terminal electrode 41 has the Sn layer 51 on a surface, but in this case, as illustrated in FIG. 1B, it is preferable that a part of the Sn layer 51 is positioned in at least a part of a portion of the terminal electrode 41 in contact with the wire 39. The Sn layer 51 not only gives favorable solderability to the terminal electrode 41 at the time of mounting, but also generates a Cu—Sn alloy layer between the Sn layer 51 and the center wire material 39*a* when the center wire material 39*a* of the wire 39 is made of copper, and bonding strength between the terminal electrode 41 and the wire 39 is improved.

In particular, when the Sn layer 51 is positioned at a portion in contact with the wire 39 in the second electrode portion 41*b* along the slope 47, the bonding strength between the wire 39 and the terminal electrode 41 in the slope 47 can be increased.

As described above, when the Sn layer 51 is positioned at the portion of the second electrode portion 41*b* along the slope 47 in contact with the wire 39, as illustrated in FIG. 1B, it is preferable that the Sn layer 51 becomes thicker from the first intermediate position 45 toward the second intermediate position 46. The Sn layer 51 becomes thicker, and thus, the thickness of the Cu—Sn alloy layer can be increased, and the bonding strength between the terminal electrode 41 and the wire 39 can be further improved. The Cu—Sn alloy layer becomes thicker as the thickness of the Sn layer 51 increases. At a portion where the Cu—Sn alloy layer is thicker, higher bonding strength is obtained.

FIG. 1B illustrates that the Sn layer 51 is present at a portion of the first electrode portion 41*a* in contact with the wire 39, but there may be no or almost no Sn layer at this portion.

In the first embodiment, as illustrated in FIG. 2, at each of the first flange portion 23 and the second flange portion 24, two slopes 47 are respectively positioned at both end portions of the flange portions 23 and 24 in the width direction. According to this configuration, the wire can be easily routed along the slope 47, and thus, the excess of the wire can be easily cut. When the excess of the wire is to be cut by using the cutting blade, since the excess of the wire can be positioned on an outermost shape of the core 25 in equipment, there is also an advantage that the cutting blade can easily hit the excess of the wire.

In the first embodiment, although the portion of the first flange portion 23 illustrated in FIGS. 1A, 1B and 3 where the first terminal electrode 41 is provided has been described, the portion of the first flange portion 23 where the third terminal electrode 43 is provided and the portions of the second flange portion 24 where the second terminal electrode 42 and the fourth terminal electrode 44 are provided have substantially the same configuration.

A dimension of the coil component 21 is arbitrary, but as an example, a dimension in a length direction (axial direction AX) is 2.0 mm, a dimension in the width direction is 1.2 mm, and a dimension in the height direction is 1.6 mm.

It is preferable that the coil component 21 is manufactured, for example, as follows.

First, the core 25 is prepared. In order to manufacture the core 25, for example, a sintered body to become the core 25 is obtained by press-molding ferrite powder with a mold and firing the obtained molded body. Thereafter, burrs are removed by performing barrel polishing on the sintered body to become the core 25, and thus, the core 25 is obtained. Although not illustrated in FIGS. 1A to 3, ridgelines of the core 25 is chamfered with small rounded corners.

Subsequently, in order to provide the terminal electrodes 41 to 44 on the core 25, for example, after the Ag layer 48 is formed by applying a conductive paste containing Ag to the mounting surfaces 31 and 32 of the first flange portion 23 and the second flange portion 24 and baking the paste, the Cu layer 49, the Ni layer 50, and the Sn layer 51 are sequentially formed by applying an electrolytic barrel plating method.

Subsequently, the wire is wound around the winding core portion 22 of the core 25 by, for example, a nozzle, one end and the other end of the first wire 39 are connected to the first terminal electrode 41 and the second terminal electrode, respectively, and one end and the other end of the second wire are connected to the third terminal electrode and the fourth terminal electrode, respectively. Here, for example, thermal pressure bonding using a heater chip is applied to the connection between the wire and the terminal electrodes. The excess of the wire connected to the terminal electrodes is cut and removed by a cutting blade as necessary.

As described above, the coil component 21 is completed.

FIGS. 4 to 8 are perspective views illustrating an appearance of the entire core included in the coil component according to second to sixth embodiments of the present disclosure with the mounting surface facing upward. FIGS. 4 to 8 are diagrams corresponding to FIG. 2. In FIGS. 4 to 8, elements corresponding to the elements illustrated in FIG. 2 are denoted by the same reference numerals, and redundant description is omitted.

Figure 4:
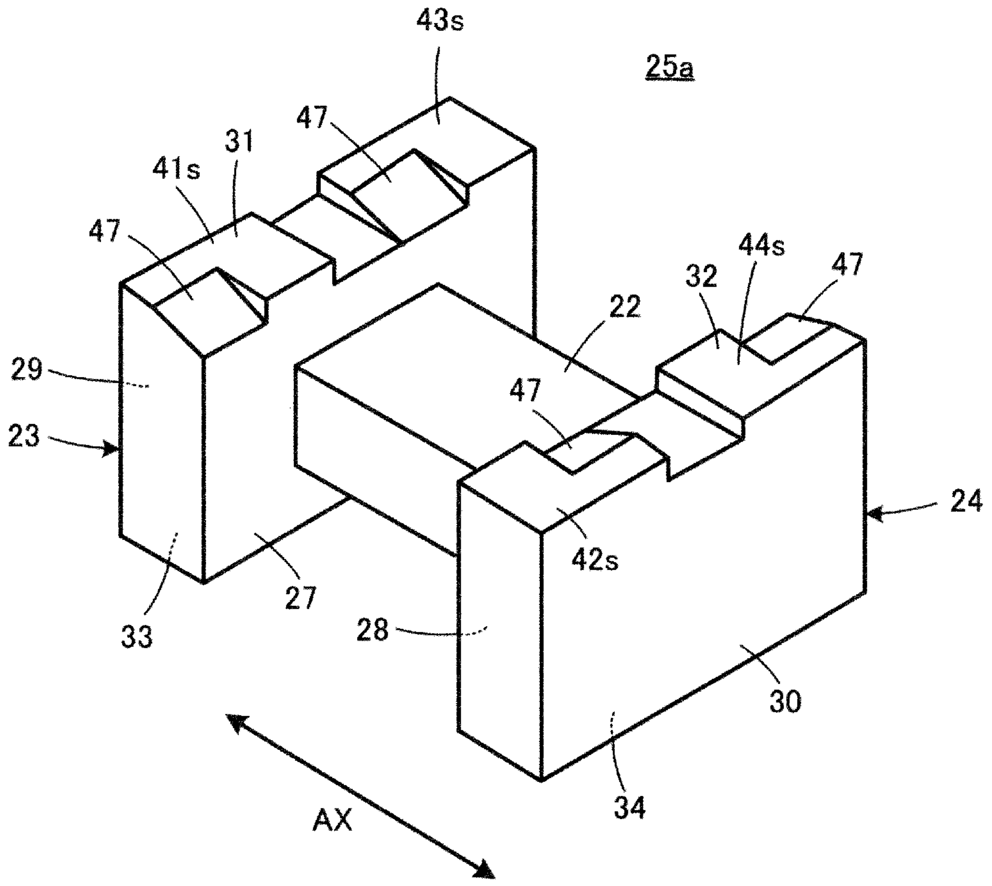
FIG. 4 is a perspective view illustrating an appearance of an entire core included in a coil component according to a second embodiment of the present disclosure with mounting surfaces facing upward.

In a core 25*a* illustrated in FIG. 4, when the direction orthogonal to the axial direction AX of the winding core portion 22 and the direction in which the mounting surfaces 31 and 32 extend is the width direction, the slope 47 at the position 43*s* of the first flange portion 23 where the third terminal electrode is provided is positioned near the center of the first flange portion 23 in the width direction. The slope 47 at the position 42*s* of the second flange portion 24 where the second terminal electrode is provided is positioned closer to the center of the second flange portion 24 in the width direction. According to such a core 25*a*, the wire can be routed to the terminal electrodes 41 to 44 in a shortest distance.

Figure 5:
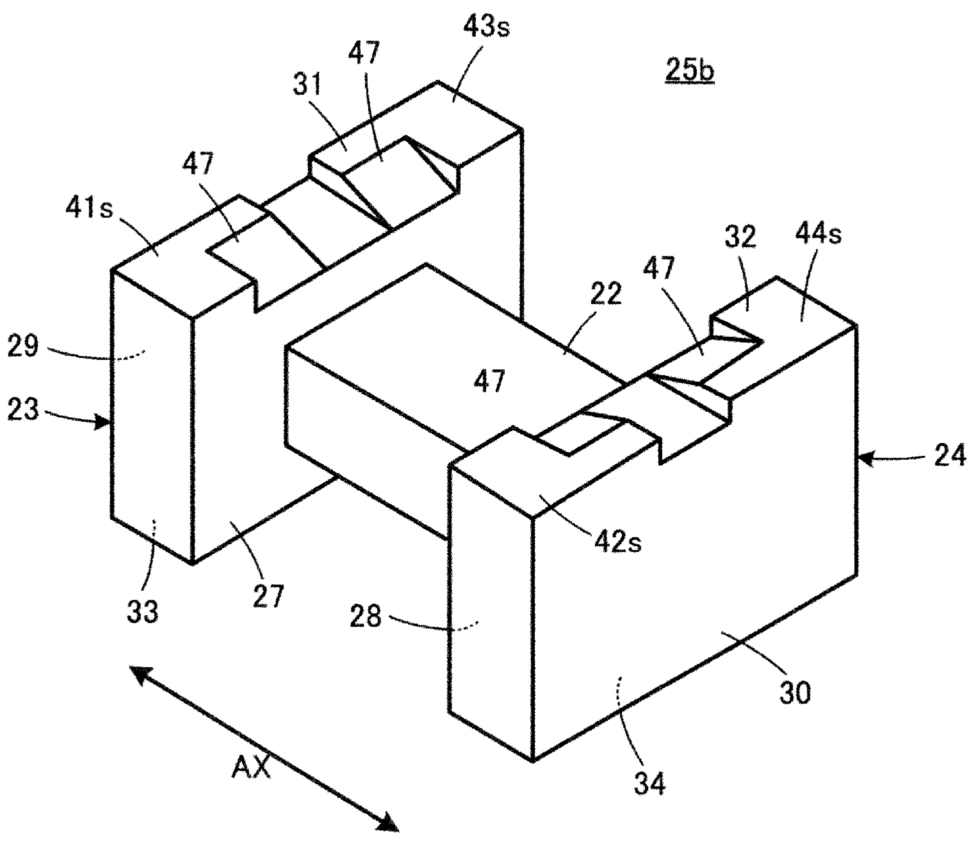
FIG. 5 is a perspective view illustrating an appearance of an entire core included in a coil component according to a third embodiment of the present disclosure with mounting surfaces facing upward.

In a core 25*b* illustrated in FIG. 5, when the direction orthogonal to the axial direction AX of the winding core portion 22 and the direction in which the mounting surfaces 31 and 32 extend is the width direction, both the slope 47 at the position 41*s* of the first flange portion 23 where the first terminal electrode is provided and the slope 47 at the position 43*s* where the third terminal electrode is provided are both positioned near the center of the first flange portion 23 in the width direction. Similarly, the slope 47 at the position 42*s* of the second flange portion 24 where the second terminal electrode is provided and the slope 47 at the position 44*s* where the fourth terminal electrode is provided are both positioned near the center of the second flange portion 24 in the width direction. According to such a core 25*b*, molding by a mold is easy. Since a protrusion responsible for molding the slope 47 in the mold is positioned closer to the center in the width direction, stress is less likely to concentrate on the protrusion, and thus, the durability of the mold is improved.

Figure 6:
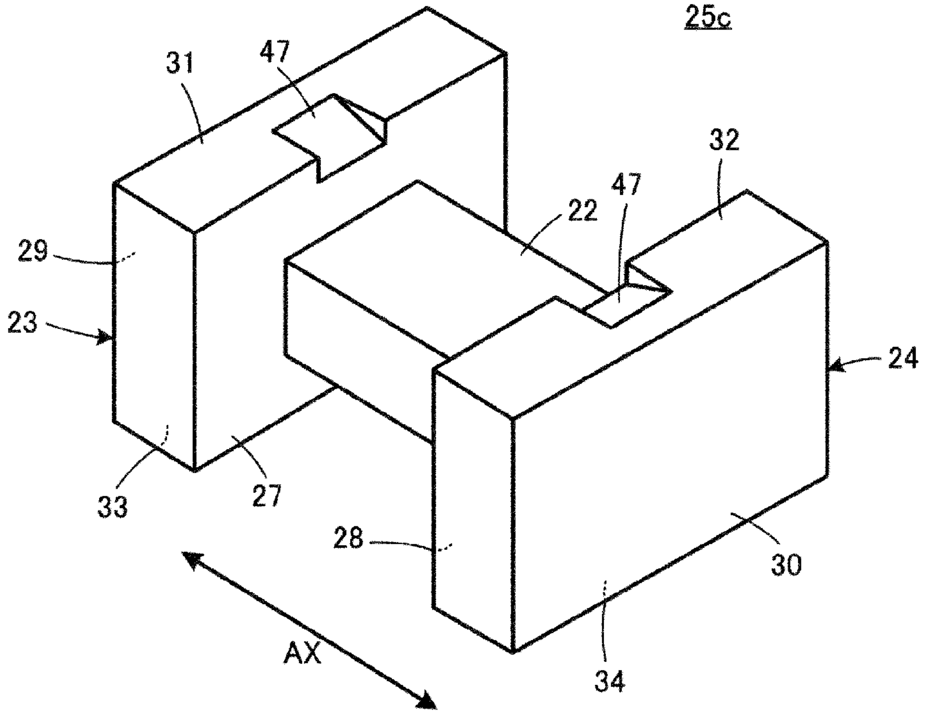
FIG. 6 is a perspective view illustrating an appearance of an entire core included in a coil component according to a fourth embodiment of the present disclosure with mounting surfaces facing upward.

A core 25*c* illustrated in FIG. 6 is for a coil component including one wire, and the slope 47 is provided at the center in the width direction of each of the first flange portion 23 and the second flange portion 24. According to the core 25*c*, since the structure is symmetrical about the portion in each of the first flange portion 23 and the second flange portion 24 where the wire is pressure-bonded, the mountability of the coil component is favorable.

Figure 7:
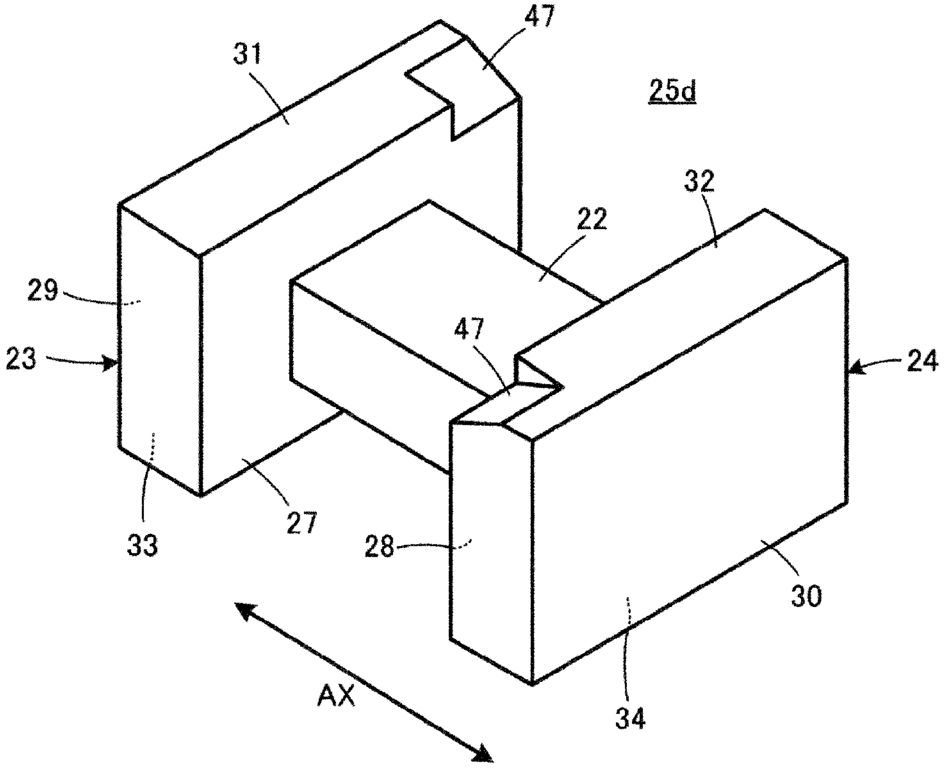
FIG. 7 is a perspective view illustrating an appearance of an entire core included in a coil component according to a fifth embodiment of the present disclosure with mounting surfaces facing upward.

Similarly to the core 25*c* illustrated in FIG. 6, a core 25*d* illustrated in FIG. 7 is for a coil component including one wire. The slope 47 is provided at the end portion in the width direction of each of the first flange portion 23 and the second flange portion 24, and the slope 47 provided in the first flange portion 23 and the slope 47 provided in the second flange portion 24 are arranged so as to face each other in a diagonal direction. According to the core 25*d*, the routing of the wire is simple.

Figure 8:
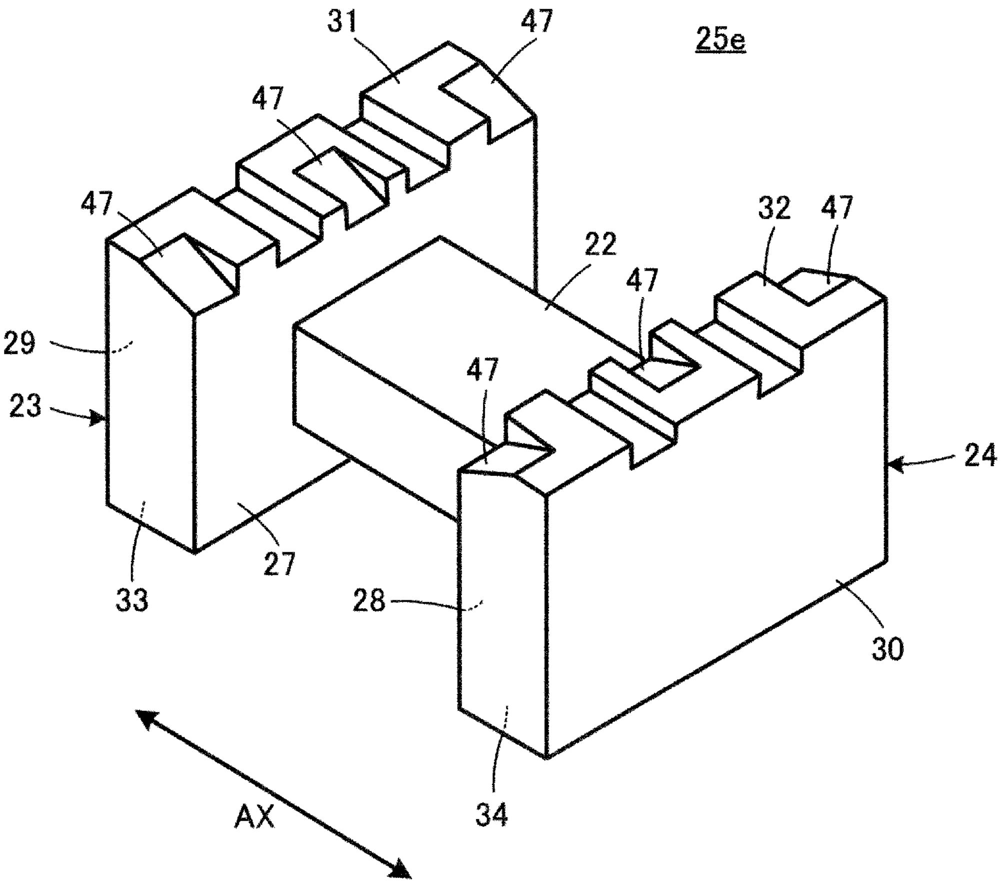
FIG. 8 is a perspective view illustrating an appearance of an entire core included in a coil component according to a sixth embodiment of the present disclosure with mounting surfaces facing upward.
Figure 9A:
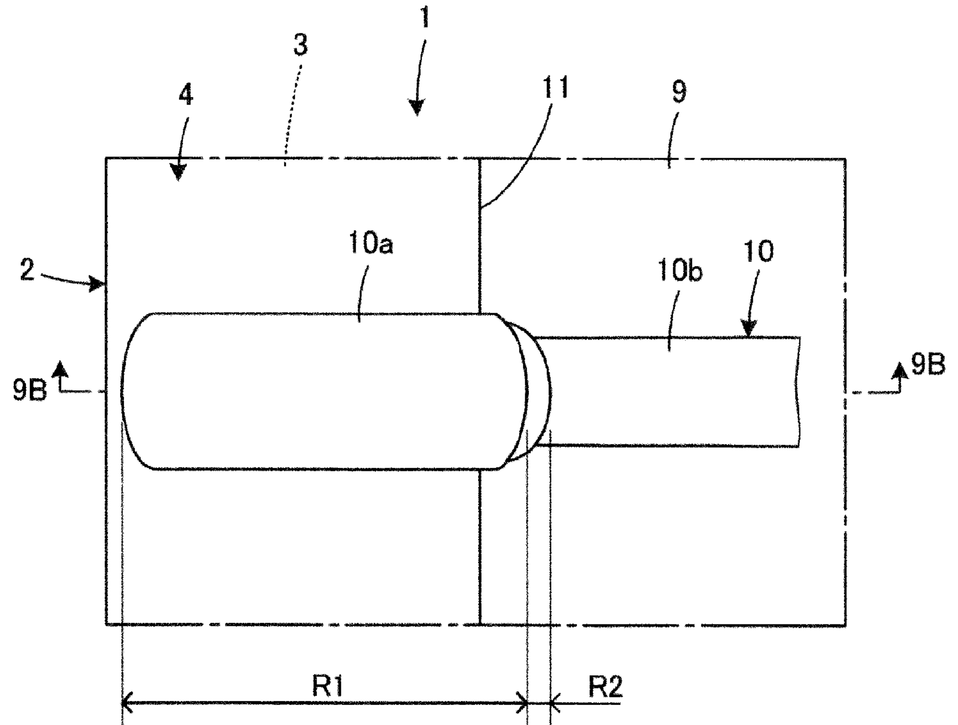
Figure 9B:
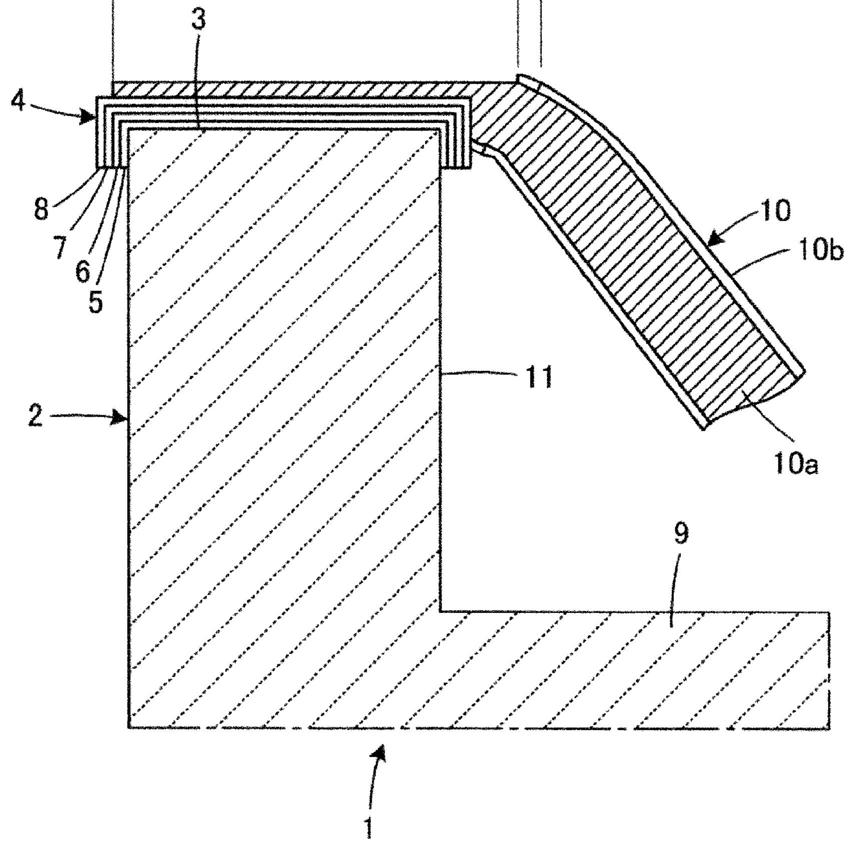

A core 25*e* illustrated in FIG. 8 is for a coil component including three wires such as a three-phase common mode choke coil. Three slopes 47 are provided side by side in the width direction in each of first flange portion 23 and second flange portion 24.

As a modification example of the core 25*e* illustrated in FIG. 8, in a core for a coil component including four or more wires, four or more slopes may be provided side by side in the width direction in each of the first flange portion and the second flange portion.

Although the present disclosure has been described in conjunction with the illustrated embodiments, various other embodiments are possible within the scope of the present disclosure.

For example, although not illustrated, the top plate may be provided so as to connect the top surfaces of the first flange portion and the second flange portion of the core. When both the core and the top plate are made of a magnetic material, the core and the top plate constitute a closed magnetic circuit.

The scope of the present disclosure is not limited to the above-described embodiments, and also extends to those in which configurations are replaced or combined in part between different embodiments.

What is claimed is:

1. A coil component comprising:

a core that has a winding core portion and flange portions at opposite end portions of the winding core portion in an axial direction;

a wire that is wound around the winding core portion; and terminal electrodes that are at the flange portions, and are electrically and mechanically connected to end portions of the wire, each of the flange portions including:

an inner end face facing the winding core portion side and positioning each of the end portions of the winding core portion in the axial direction, an outer end face facing an opposite side of the inner end face, a mounting surface connecting the inner end face and the outer end face and facing a mounting substrate side at the time of mounting, and a top surface facing an opposite side of the mounting surface, a slope at a boundary portion between the mounting surface and the inner end face, the slope extending to connect a first intermediate position in a direction along the mounting surface between the inner end face and the outer end face, and a second intermediate position in a direction along the inner end face between the mounting surface and the top surface, each of the terminal electrodes including a first electrode portion along the mounting surface, and a second electrode portion along the slope so as to extend from the first electrode portion to a middle of the slope, the wire being electrically and mechanically connected at both the first electrode portion and the second electrode portion, and a diameter of the wire on the winding core portion being larger than a dimension of the second electrode portion in a height direction measured in a direction orthogonal to the mounting surface, and a dimension of the slope in a depth direction, which is a distance from the first intermediate position to the second intermediate position measured in the direction orthogonal to the mounting surface, being larger than the diameter of the wire.

2. The coil component according to claim 1, wherein a contour line of the slope extends in a direction orthogonal to the axial direction of the winding core portion as viewed in the direction orthogonal to the mounting surface.

3. The coil component according to claim 2, wherein an angle defined by the slope with respect to a surface including the mounting surface is from 20° to 60°.

4. The coil component according to claim 2, wherein a flat portion extending in parallel with the mounting surface is in the second intermediate position in which one end portion of the slope is located.

5. The coil component according to claim 2, wherein when a width direction is defined as a direction in which the mounting surface extends, and which is orthogonal to the axial direction of the winding core portion, two terminal electrodes and two slopes are side by side in the width direction at each of the flange portions, respectively.

6. The coil component according to claim 2, wherein as a dimension measured in the axial direction of the winding core portion, a dimension of a connection portion at which the wire is connected to the first electrode portion of the terminal electrode is from 20% to 50% of a dimension between the inner end face and the outer end face of the flange portion.

7. The coil component according to claim 2, wherein the first electrode portion of the terminal electrode includes a connection portion to which the wire is connected, and a mounting portion configured to connect to a mounting substrate, and the connection portion and the mounting portion being flush.

8. The coil component according to claim 2, wherein the wire includes a center conductor and an insulating film that covers the center conductor, the insulating film partially has a deteriorated portion due to heat, and the deteriorated portion is located within a position closer to the outer end face than a surface including the inner end face.

9. The coil component according to claim 2, wherein the terminal electrode has a Sn layer on a surface, and a portion of the Sn layer is located at at least a portion of the terminal electrode in contact with the wire.

10. The coil component according to claim 3, wherein a flat portion extending in parallel with the mounting surface is in the second intermediate position in which one end portion of the slope is located.

11. The coil component according to claim 1, wherein a flat portion extending in parallel with the mounting surface is in the second intermediate position in which one end portion of the slope is located.

12. The coil component according to claim 1, wherein when a width direction is defined as a direction in which the mounting surface extends, and which is orthogonal to the axial direction of the winding core portion, two terminal electrodes and two slopes are side by side in the width direction at each of the flange portions, respectively.

13. The coil component according to claim 12, wherein each of the two slopes are located at opposite end portions of each of the flange portions in the width direction.

14. The coil component according to claim 12, wherein the two slopes are located near a center of each of the flange portions in the width direction.

15. The coil component according to claim 1, wherein as a dimension measured in the axial direction of the winding core portion, a dimension of a connection portion at which the wire is connected to the first electrode portion of the terminal electrode is from 20% to 50% of a dimension between the inner end face and the outer end face of the flange portion.

16. The coil component according to claim 1, wherein the first electrode portion of the terminal electrode includes a connection portion to which the wire is connected, and a mounting portion configured to connect to a mounting substrate, and the connection portion and the mounting portion being flush.

17. The coil component according to claim 1, wherein the wire includes a center conductor and an insulating film that covers the center conductor, the insulating film partially has a deteriorated portion due to heat, and the deteriorated portion is located within a position closer to the outer end face than a surface including the inner end face.

18. The coil component according to claim 1, wherein the terminal electrode has a Sn layer on a surface, and a portion of the Sn layer is located at at least a portion of the terminal electrode in contact with the wire.

19. The coil component according to claim 18, wherein the Sn layer is located at a portion of the second electrode portion in contact with the wire.

20. The coil component according to claim 19, wherein the Sn layer located at the portion of the second electrode portion in contact with the wire becomes thicker from the first intermediate position toward the second intermediate position.

* * * * *